United States Patent
Jaaskelainen et al.

(10) Patent No.: US 11,668,852 B2
(45) Date of Patent: Jun. 6, 2023

(54) DETERMINING FLUID DISTRIBUTION AND HYDRAULIC FRACTURE ORIENTATION IN A GEOLOGICAL FORMATION

(71) Applicant: Halliburton Energy Services, Inc., Houston, TX (US)

(72) Inventors: Mikko Jaaskelainen, Houston, TX (US); Eric James Davis, San Francisco, CA (US); Michel Joseph LeBlanc, Houston, TX (US); John Laureto Maida, Jr., Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/965,348

(22) Filed: Oct. 13, 2022

(65) Prior Publication Data

US 2023/0040293 A1   Feb. 9, 2023

Related U.S. Application Data

(63) Continuation of application No. 17/013,983, filed on Sep. 8, 2020, now Pat. No. 11,500,122.

(51) Int. Cl.
*G01V 8/16* (2006.01)
*E21B 49/08* (2006.01)
*G01L 1/22* (2006.01)
*G01L 1/24* (2006.01)
*G06F 17/18* (2006.01)

(52) U.S. Cl.
CPC .............. *G01V 8/16* (2013.01); *E21B 49/087* (2013.01); *G01L 1/22* (2013.01); *G01L 1/242* (2013.01); *G06F 17/18* (2013.01)

(58) Field of Classification Search
CPC ......... E21B 49/087; G01L 1/22; G01L 1/242; G01V 8/16; G06F 17/18
See application file for complete search history.

(56) References Cited

U.S. PATENT DOCUMENTS 10,125,605 B2 * 11/2018 Mayerhofer ............ G01L 1/246
2021/0285323 A1   9/2021 Davis et al.

OTHER PUBLICATIONS

Furst, et al., "Tiltmeter Data Inversion to Characterize Full Strain Tensor Source at Depth: Application to Reservoir Monitoring", Journal of Geodesy, vol. 94, No. 5, May 2020, 25 pages.
CA3,098,813, "Office Action", dated Jan. 26, 2022, 4 pages.
Okada, "Internal Deformation Due to Shear and Tensile Faults in a Half-Space", Bulletin of the Seismological Society of America, vol. 82, No. 2, Apr. 1992, pp. 1018-1040.

* cited by examiner

*Primary Examiner* — Manuel L Barbee
(74) *Attorney, Agent, or Firm* — Kilpatrick Townsend & Stockton LLP

(57) ABSTRACT

A system can calculate estimated strain data for a fracture in a geological formation at each of a plurality of selected locations detectable by a strain measurement device. The system can receive real strain data from the strain measurement device for the geological formation. The system can perform an inversion to determine a probable distribution of fluid volume and hydraulic fracture orientation in the geological formation based on the estimated strain data and real strain data. The system can determine adjustments for a fracturing operation based on the inversion.

8 Claims, 4 Drawing Sheets

DETERMINING FLUID DISTRIBUTION AND HYDRAULIC FRACTURE ORIENTATION IN A GEOLOGICAL FORMATION

CROSS-REFERENCE

This is a continuation of U.S. patent application Ser. No. 17/013,983, titled "Determining Fluid Distribution and Hydraulic Fracture Orientation in a Geological Formation," and filed Sep. 8, 2020, the entirety of which is incorporated by reference herein.

TECHNICAL FIELD

The present disclosure relates generally to wellbore fracturing operations and, more particularly (although not necessarily exclusively), to determining fluid distribution and hydraulic fracture orientation in a geological formation.

BACKGROUND

Hydrocarbon exploration operations may involve hydraulic fracturing operations. Fracturing operations can include perforating multiple locations with a number of holes. Fracturing operations can cause fractures to grow and spread in a geological formation. The fractures cause the formation to deform and the formation stress can be altered in response to the growth of the fractures. It can be difficult to understand how the geological formation stress changes in real time during the fracturing operation, so it may be difficult to determine how the fractures grow and whether the fractures approach a neighboring well.

Further, strain sensing cables may provide inaccurate or unreliable sensing with poor sensitivity. The low sensitivity may limit the area of the fracturing stage for which strain data can be generated. Additionally, data interpretation can be computationally intensive and slow, which can prohibit real-time interpretation and adjustments for the fracturing operation.

DETAILED DESCRIPTION

Figure 1:
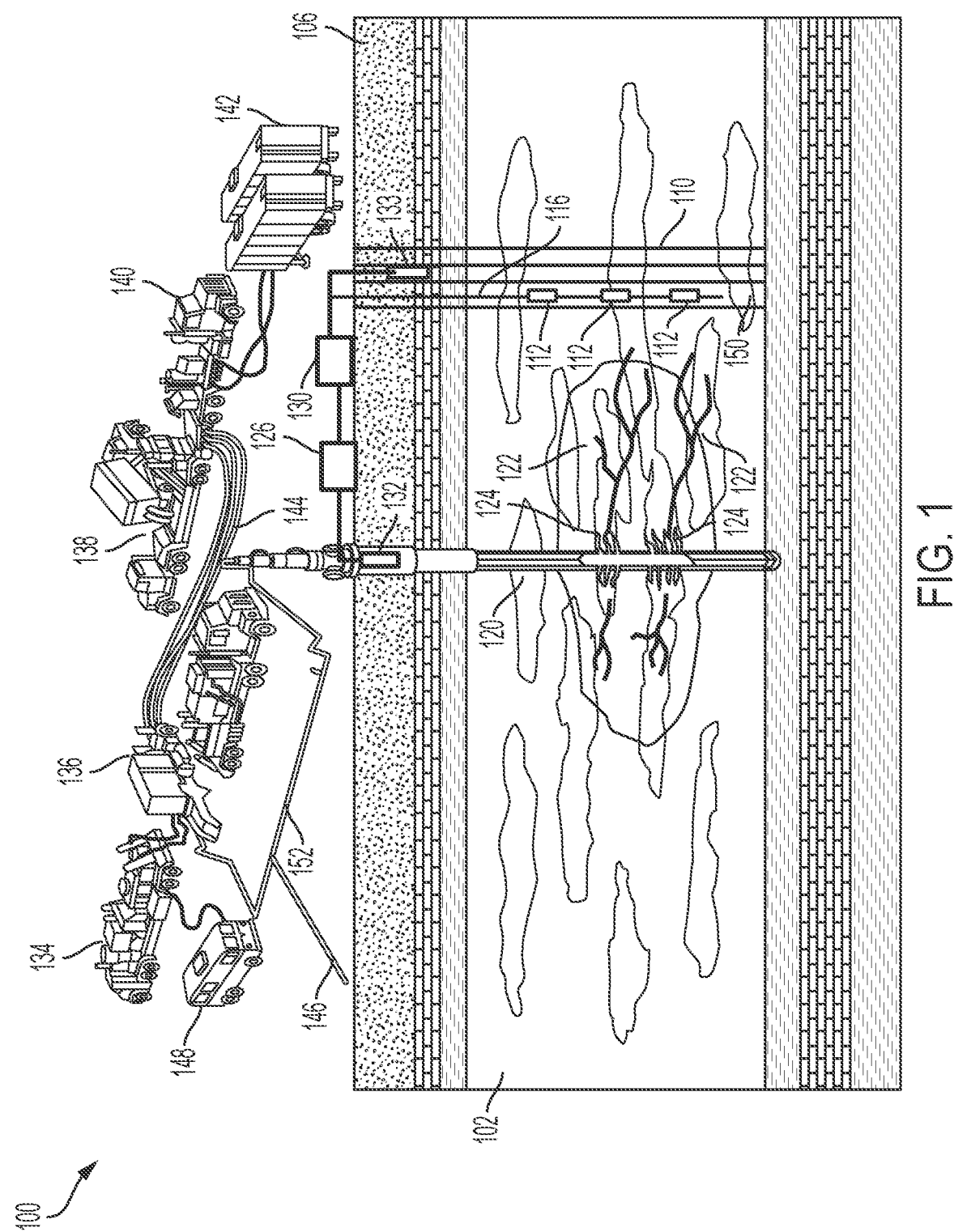
FIG. 1 is a schematic of a well system in a geological formation with fractures according to one example of the present disclosure.

Certain aspects and examples of the present disclosure relate to strain sensing and analysis during a fracturing operation. Strain may be sensed with a fiber optic cable in communication with a computing device. By using a system according to some examples, probable fluid distribution and fracture orientation for a geological formation can be determined. A linear inversion may be performed in real-time based on estimated strain data and real strain data so that adjustments may be determined for the fracturing operation. Some aspects of the techniques described in the present disclosure may reduce costs and computing requirements associated with acquiring and analyzing strain during the fracturing operation.

Hydraulic fracturing is a well stimulation technique involving the fracturing of subsurface formations by pumping high pressure liquids into the formation to create a network of fractures to aid in hydrocarbon production. The process involves drilling a well into a subsurface hydrocarbon formation, inserting a casing into the well, cementing the annular space between the wellbore and casing such that ground water contamination is avoided and the hydrocarbon bearing reservoir intervals are isolated. The hydrocarbon reservoir intervals can then be connected to the production casing through perforations and high pressure fracking fluid (e.g., water, proppant and sand, thickening agents to suspend proppants and sand in the fracking fluid) can be pumped down at pressures high enough to break the rock apart and form fractures. The fluid entering the fractures can carry proppant and sand that will remain in the fractures and the fluid may leak off into the formation after the fracturing operation. These propped fractures then allow hydrocarbons to flow into a wellbore.

A drill bit and drill string may be used for drilling into the formation. The drill bit and drill string may have various sensors that collect data while drilling, and this data can be used to update reservoir models and plan for fracturing operations. A casing can be deployed in the wellbore and once the casing reaches the total depth of the well, cement can be pumped down to fill the annular space between the casing and the formation. The cement is often pumped through the casing and pushed out at the end of the casing at the deepest point in the well and then pushed out in the annular space. The casing may then be rotated to ensure that the cement spreads around the casing to form a sufficient cement bond between the casing and the formation.

Unconventional wells can be fractured in stages. The first stage in the fracturing process can involve making channels through the casing and pump fracturing fluid into the formation. This can be done with perforation guns firing into the casing where a number of shaped charges can be used to shoot through the casing and cement into the formation. A channel can be formed where high-pressure fluids pumped into the casing can access the formation and fracture channels into the formation. The high-pressure fluid can carry the proppant and sand into the formation to generate flow channels for hydrocarbons. Sensing cables located outside the casing may be damaged by perforating through the sensing cables unless the orientation of the cable is known and the perforation guns are oriented away from the sensing cables. One way to determine the cable orientation range can be by performing a logging run and mapping the cable location by attaching orientation devices co-located with the sensing cables. Various other techniques, such as those using sleeves and balls, may also be used to access the formation and that can mitigate or remove the risk of cable damage. But these techniques, including performing a mapping, may be cost-prohibitive or involve other trade-offs.

The sensing cables outside the casing may be instrumented with sensors. The sensors may be electrical or fiber optic, and the sensors may be single point, multi-point, or fully distributed sensors. Examples of electrical sensors may include temperature, pressure, strain, accelerometers, geophones, and chemical sensors. Examples of fiber-optic sensors may be temperature, pressure, strain, vibration, or acoustic sensors. The fiber-optic sensors can be based on a variety of sensing principles ranging from amplitude sensing, wavelength detection, Rayleigh scattering, Raman scattering, Brillouin scattering, interferometric sensing based on Michelson, Mach-Zehnder, or Sagnac configurations, or homodyne or heterodyne interferometric detection schemes. The fiber-optic sensors may use one or multiple of continuous wave sensing or pulsed time domain optical reflectometry sensing or wavelength division multiplexing type schemes. Many of the sensors used for surface sensing and subsurface sensing can record data at frequencies ranging from 0.1 mHz to 10 kHz sample rate, and the data may be used to update models for fracture spread controls, and used for closed loop control.

Distributed Acoustic Sensing (DAS) data may be used for microseismic event detection and mapping. DAS systems can be based on Rayleigh scattering and Optical Time Domain Reflectometry (OTDR) single-pulse or dual-pulse schemes interrogated using heterodyne or homodyne schemes. Other Optical Frequency Domain Reflectometry (OFDR) based schemes may also be used as well as Fiber Bragg Grating (FBG) based interferometric approaches where interferometers may be formed between pairs of FBG's. The DAS data may be used to calculate and visualize fluid flow rates, fracture growth rates, fracture volumes, or a combination of these or other features. One challenge related to microseismic event detection is that the resolution can be coarse and the sensing technology cannot differentiate between individual fractures. Distributed Temperature Sensing (DTS) data may be used to look at fluid flow allocation and for warmback measurements to determine where fracturing fluid entered the formation during a stage. DTS systems can be based on Raman scattering based on either OTDR or OFDR based measurements, and various Brillouin based approaches may also be used for DTS measurements. DAS-based measurements may also be used for determining thermal events where thermal changes may change the optical path length, thus impacting the frequency response of the measured signal. Raman, Brillouin, and discrete-point, FBG-based interferometric measurements can provide dynamic temperature measurements in response to changes in fiber length within the interferometer. Formation and reservoir information such as fracture initiation points derived from DTS warmback measurements, can be done post-stage, and real-time control may not be possible based on the DTS data. Some limited fluid movement data can be measured in real-time with DTS systems, but in general in a reactive manner after the fluid accesses the sensing cable.

Pressure sensing data can be used for measurements in treatment wells and monitoring wells, including for real-time control of fracture pumps and determining downhole properties (e.g., fracture growth rates, complexities, well-to-well interactions). Pressure measurements, however, are cumulative along the wellbore and it may not be possible to identify spatial events along the wellbore. Fiber optic pressure sensor may be based on FBG wavelength shift or Fabry-Perot interferometric responses.

Distributed Strain Sensing (DSS) is a technology capable of providing spatial resolution of events and is capable of doing so proactively before a fracture has crossed into a monitoring well. Distributed strain can be measured with fiber optic cables, and a proper strain measurement can involve a sufficient coupling between the measurement object and optical fiber. DSS may be based on Brillouin sensing, FBG sensing, or the low frequency portion of DAS type systems as mentioned above.

Fiber optic cables used for down-hole distributed strain sensing in oil and gas applications can be fiber in metal tubes (FIMTs). In an FIMT, an optical fiber resides in a gel in which the optical fiber can move around freely. This design can protect the optical fiber and increase the survivability of the optical fiber. The FIMTs can have an amount of excess optical fiber length (EFL) compared to the metal tube to account for thermal expansion of the metal tube. EFL can be mathematically defined as equation (1), with "L" representing length, for fiber or cable, as noted. An optical fiber in a helical configuration makes an angle θ with the helix central axis. The EFL for a helically configured optical fiber can be defined using equation (2), where S is the length of the optical fiber and H is the length of the metal tube. In some examples, the optical fiber may not be able to move relative to the fiber optic cable and the optical fiber can maintain contact with the inner diameter of the wall of the FIMT. In such examples, strain in the fiber optic cable ($\varepsilon_{cable}$) can be coupled to the optical fiber to create a strain in the optical fiber ($\varepsilon_{fiber}$) according to equation (3), where v is the Poisson ratio of the fiber optic cable. Equation (3) can be expressed in terms of EFL using equation (4). The presence of EFL can decrease the strain coupling from the optical fiber to the fiber optic cable by a ratio described in equation (5), where $v_{eff}$ is the effective Poisson ratio of the optical fiber. The $v_{eff}$ is a larger value of the Poisson ratio resulting from the optical fiber not remaining in contact with the inner diameter of the FIMT.

$$EFL_\% = \frac{(L_{fiber} - L_{cable})}{L_{cable}} \cdot 100\% \quad (1)$$

$$EFL = \frac{(S-H)}{H} = \frac{1}{\cos(\theta)} - 1 \quad (2)$$

$$\varepsilon_{fiber} = \varepsilon_{cable}(1 - (1+v)\sin^2(\theta)) \quad (3)$$

$$\varepsilon_{fiber} = \varepsilon_{cable}(1 - 2(1+v)EFL) \quad (4)$$

$$\frac{\varepsilon_{fiber}}{\varepsilon_{cable}} = 1 - 2(1+v_{eff})EFL \quad (5)$$

Thermal expansion for metals can be around 20 ppm/C, whereas fused silica-based optical fibers can have a thermal coefficient of expansion of around 0.55 ppm/C. So, the metal tube can grow faster than the optical fiber due to thermal expansion. As a result, the optical fiber may be put in tension at elevated temperatures. A benefit of an FIMT can be that the optical fiber may not experience excess tension. But, the optical fiber may not be coupled to the metal tube that may be coupled to the formation, such that strain sensing may be inaccurate or not possible.

A FIMT with, e.g., 0.2% EFL can be manufactured with a gel co-embedded within the FIMT. The gel can help take heat away from the optical fiber during the welding operation of the FIMT. The gel can be a hydrogen-scavenger to reduce the level of hydrogen experienced by the fiber. The gel can also prevent damage to the fiber coating, which can occur due to rubbing of the fiber against the rough inner wall of the FIMT. Another role of the gel can be to prevent the migration of the fiber within the FIMT, which can alter the distribution of EFL within the FIMT and expose some region of the fiber to high tensions or compressions that can result in the fiber buckling on itself and breaking.

One type of gel that can be used in FIMTs is thixotropic, which becomes less viscous when subjected to an applied stress. As a result, thixotropic gel can resist motion at low shear stresses, but can flow once a shear force exceeds a threshold value. The viscosity of the gel decreases with temperature. Because such a gel cannot convey a high shear stress, it may not provide a sufficient strain coupling medium between the FIMT wall and fiber.

Certain aspects of the present disclosure include a fiber optic cable assembly with high sensitivity. The fiber optic cable assembly may have optical fibers and a material extending around the optical fibers. The material may be a gel, thermoset, or other material. The material can have a high effective modulus at high frequencies and a low effective modulus at low frequencies. The material can have a large degree of crosslinking between its constituent molecules, such that the material can convey a high level of shear stress.

A system according to some examples can accurately measure strain while at the same time providing a high reliability cable. Additionally, accurate strain-based solutions can be rapidly determined. Accurate and timely output from a strain sensing system can be combined with other sensing data to reduce uncertainty. The data can be visualized as individual fractures with azimuth and growth rates as well as volumes that can be overlaid with target treatment volumes. The data can also be used to update future stage treatment in response to changes in formation stress as the well treatment continues. Changing azimuth over the course of a well treatment can change the effective fracture length before a neighboring well is intersected.

Non-linear models can be used to determine fracture length, fracture azimuth, a number of fractures, fracture growth rates, fracture tip locations, and fracture volumes. But, non-linear models often involve a significant amount of computing power and each iteration may take a long time since the solution space may be very complex and cover a large range of variables. Certain aspects of the present disclosure include linear models for determining fracture properties quickly.

The fracture mapping may be used in real-time with fracture spread control with the objective of controlling subsurface fracture propagation to mitigate well interference events. Fracture lengths, fracture growth rate and fracture azimuth evolution can be used to predict future fracture behavior as subsurface stress fields evolve during the fracturing operation. The strain data can be used for operations such as optimizing fluid and proppant volumes, treatment pump rates, perforation strategy, and fluid chemistry.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a well system 100 in a geological formation 102 with fractures 122 according to one example of the present disclosure. The well system 100 includes a first well (hereinafter referred to as a "fracturing well") 120 and a second well (hereinafter referred to as a "monitoring well") 110 extending through various earth strata that form a geological formation 102. The fracturing well 120 and the monitoring well 110 can be vertical, deviated, horizontal, or any combination of these.

Surface equipment for a fracturing operation can be located above a surface 106 of the geological formation 102. The surface equipment can include a pumper 134, a treatment manifold 136, proppant 138, a blender 140, fluid storage tanks 142, low pressure slurry 144, high pressure slurry 152, a bleed line 146, and a control center 148. The fluid storage tanks 142 can hold water or other fracturing fluid prior to fluid being pumped downhole. The fluid storage tanks 142 can be connected to the blender 140, such that the fracturing fluid can flow from the fluid storage tanks 142 to the blender 140. The blender 140 can combine desired fracturing components (e.g., water, proppant 138, chemicals) to create a slurry for the fracturing operation. Low pressure slurry 144 can flow from the blender 140 to the treatment manifold 136, where the treatment manifold 136 can direct fluid flow to wells of the geological formation 102. The pumper 134 can receive the low pressure slurry 144 from the treatment manifold 136 and inject high pressure slurry 152 into the fracturing well 120. A portion of the high pressure slurry 152 can be directed along the bleed line 146 to bleed off pressure from treatment lines after the fracturing operation. The control center 148 can include computing systems and other equipment for monitoring the fracturing operation.

A well operator can obtain hydrocarbon fluid from the geological formation 102. To obtain the hydrocarbon fluid, the well operator can perform hydraulic fracturing by injecting fluid at high pressure into the geological formation 102. The fluid can be injected into the geological formation 102 using fracture spread on the surface 106. The high pressure of the fluid can cause stresses on the rock in the geological formation 102 to change, causing the rock to part, slip, or shear along a preexisting zone of weakness (e.g., a fault) and create one or more fractures 122 along which slips or other fracture surfaces relative motion can occur. In some examples, the fractures 122 can approach the monitoring well 110. In some examples, a sensor system 132 can be positioned in the fracturing well 120. Using one or more sensors, the sensor system 132 can detect data about the fracturing well 120. For example, the sensor system 132 can detect an amount of fluid exiting the fracturing well 120. An additional sensor system 133 can be positioned in the monitoring well 110 to detect data about the monitoring well 110.

A fiber optic cable 116 may deployed in an annular space 150 of the monitoring well 110. The fiber optic cable 116 may be positioned along an outer surface of a casing string. The fiber optic cable 116 may be a fiber in metal tube ("FIMT") cable that includes one or more optical fibers positioned within a metal tube. Strain measured by the fiber optic cable 116 can correspond to strain in the geological formation 102. A material (e.g., gel) may extend around the optical fibers. The material can have a high effective modulus at high frequencies (e.g., greater than about 0.1 Hz) and a low effective modulus at low frequencies (e.g., less than about 0.1 Hz). The material may be viscoelastic and have a property of slow creep to release tension in the optical fibers over time. The material can protect the optical fibers from experiencing high tension for long period of time and shearing as a result. Alternatively, the material may be a thermoset material, such as a thermosetting polymer, resin, epoxy, or plastic. The thermoset material can be cured after the fiber optic cable 116 is deployed in the monitoring well 110. This can allow extra-fiber length of the optical fibers, present at room temperature, to be reduced due to the thermal expansion of the metal cable without adding tension to the optical fiber. The optical fibers may have a helical or sinusoidal disposition within the cable to such that the optical fiber is of greater length than the fiber optic cable 116. Likewise, the cable may be longer than the casing by disposing the cable along the casing in a pattern (e.g., partial helix) along the length (the whole length, or along one or more sections) of the casing. Thus, a length of the casing string may not be the same as a length of the fiber optic cable 116 or the optical fibers of the fiber optic cable 116. The fiber optic cable 116 can include sensors 112 distributed along the length of the fiber optic cable 116.

The fiber optic cable 116 may be communicatively coupled to one or more sensing systems, for example strain (or deformation) measurement device 130 positioned at the surface 106. Examples of the strain (or deformation) measurement device 130 include Distributed Acoustic Sensing devices, tiltmeters, volumetric strain-meters, and any other devices capable of measuring strain or deformation. The strain measurement device 130 may also be communicatively coupled via a communication link to a computing device 126. The computing device 126 may receive information and data from the strain measurement device 130 related to the data collected by the fiber optic cable 116 for mapping the fractures 122 during a fracturing operation.

The strain (or deformation) measurement device 130 may monitor and record real strain data in the geological formation 102 from the fiber optic cable 116. The optical fibers can include sensors 112 distributed along the length of the fiber optic cable 116 to determine real strain data. The real strain data may be transmitted from the strain measurement device 130 to the computing device 126. The computing device 126 may, either alone or in conjunction with a manual technique, process and transform the real strain data received from the strain measurement device 130 for mapping the fractures 122 in the geological formation 102 during the fracturing operation. In some examples, a fiber optic cable and sensors can also be deployed in the fracturing well 120 to determine an amount of fluid predicted to flow into each perforation cluster.

The computing device 126 can calculate estimated strain data for a facture (e.g., fractures 122) in the geological formation at selected locations detectable by the strain measurement device 130. The selected locations may be determined based upon the location of the perforation clusters in the fracturing well 120. The perforation clusters can correspond to fracture initiation points 124 from which fractures 122 grow. The computing device 126 can apply an analytical model to calculate the estimated strain data at the selected locations based on properties (e.g., width, strike slip, dip slip) of the fracture at the selected locations. An example of an analytical model the computing device 126 can apply is the Okada model.

In some examples, the computing device 126 can perform a linear inversion based on the estimated strain data and the real strain data to determine a probable distribution of fluid volume and hydraulic fracture orientation in the geological formation 102. The computing device 126 may determine adjustments for the fracturing operation based on the linear inversion. For example, the computing device 126 may determine a fluid flow rate or proppant concentration should be adjusted based on the linear inversion. As one particular example, the linear inversion may indicate that the fractures 122 are approaching the monitoring well 110 in the geological formation 102. Based off this indication, the computing device 126 can determine adjustments for the fracturing operation to decrease the likelihood of the fractures 122 reaching the monitoring well 110. Adjustments to the fracturing operation in the treatment well may include one or more of changing the pumping rate, changing the proppant concentration, changing the treatment pressure, changing the chemical concentration and/or composition, adding diverter materials, or pump fluid into the monitoring well. The computing device 126 is depicted as being on the surface 106 in FIG. 1, but in other configurations the computing device 126 can be deployed elsewhere, such as remotely from the oilfield area. In various examples, the computing device 126 includes a processor, memory, a power source, and communication components for communicating with other devices. Additionally, the strain measurement device 130 may be deployed elsewhere, such as in the control center 148 of the oilfield area.

Figure 2:
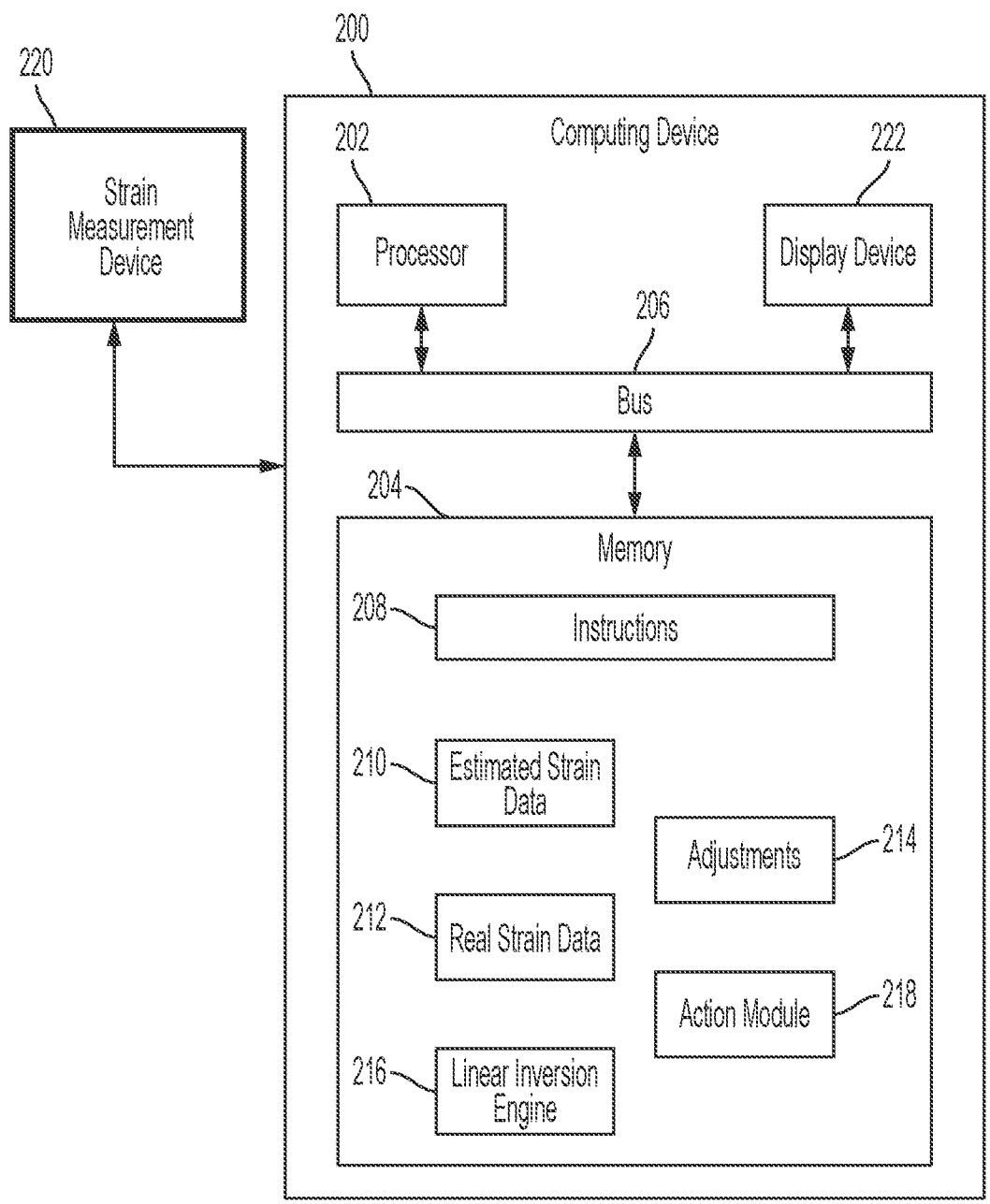
FIG. 2 is a block diagram of a computing device for determining fluid distribution and fracture orientation in a geological formation according to one example of the present disclosure.

FIG. 2 is a block diagram of a computing device 200 for determining fluid distribution and fracture orientation in a geological formation according to one example of the present disclosure. The computing device 200 can include a processor 202, a bus 206, a memory 204, a display device 222. The computing device 200 may be in communication with a strain measurement device 220. In some examples, the components shown in FIG. 2 can be integrated into a single structure. For example, the components can be within a single housing with a single processing device. In other examples, the components shown in FIG. 2 can be distributed (e.g., in separate housings) and in electrical communication with each other using various processors. It is also possible for the components to be distributed in a cloud computing system or grid computing system.

The processor 202 can execute one or more operations for fracture mapping in a geological formation. The processor 202 can execute instructions 208 stored in the memory 204 to perform the operations. The processor 202 can include one processing device or multiple processing devices. Non-limiting examples of the processor 202 include a field-programmable gate array ("FPGA"), an application-specific integrated circuit ("ASIC"), a processor, a microprocessor, etc.

The processor 202 is communicatively coupled to the memory 204 via the bus 206. The memory 204 may include any type of memory device that retains stored information when powered off. Non-limiting examples of the memory 204 include electrically erasable and programmable read-only memory ("EEPROM"), flash memory, or any other type of non-volatile memory. In some examples, at least some of the memory 204 can include a non-transitory medium from which the processor 202 can read instructions 208. A computer-readable medium can include electronic, optical, magnetic, or other storage devices capable of providing the processor 202 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions 208. The instructions 208 can include processing device-specific instructions generated by a compiler or an interpreter from code written in any suitable computer-programming language, including, for example, C, C++, C#, Python, etc.

The computing device 200 includes a display device 222. The display device 522 can represent one or more components used to output data. Examples of the display device 222 can include a liquid-crystal display (LCD), a computer monitor, a touch-screen display, etc.

In some examples, the processor 202 can calculate estimated strain data 210 for a fracture in a geological formation at selected locations detectable by the strain measurement device 220. The processor 202 can determine the selected locations based on known, suspected, or possible locations of fractures in the geological formation. The processor 202 may apply a model, such as an Okada model, to calculate the estimated strain data 210.

In some examples, calculating the estimated strain data 210 involves the processor 202 receiving information for three linear properties (e.g., width, strike slip, and dip slip) for three orthogonal fractures at each of the selected locations. The processor 202 can calculate estimated strain data 210 for the fractures at the selected locations based on the linear properties. For example, the processor 202 can receive a specific value for the width, strike slip, and dip slip for three orthogonal fractures at a selected location and calculate an estimated strain for the specified values. The processor 202 can thus generate a set of Green's functions that can calculate the estimated strain data that corresponds to certain values for the linear properties at the selected location. The processor 202 can build up a data structure (e.g., matrix) of estimated strain data 210 for various linear properties at the selected locations.

In some examples, the processor 202 can receive real strain data 212 from the strain measurement device 220 for the geological formation. The strain measurement device 220 may receive the real strain data 212 from a fiber optic cable deployed in a wellbore of the geological formation during a fracturing operation. The fiber optic cable can include one or more optical fibers.

In some examples, the processor 202 can execute a linear inversion engine 216 to perform a linear inversion based on the estimated strain data 210 and the real strain data 212. The linear inversion engine 216 can determine a probable distribution of fluid volume and hydraulic fracture orientation in the geological formation based on the estimated strain data 210 and the real strain data 212. The linear inversion may be low rank or even unstable since nearby tensor locations can produce similar strain data, so the linear inversion engine 216 may perform stabilizing operations prior to the linear inversion. For example, the linear inversion engine 216 can bound the linear inversion by predefined constraints (e.g., pumped volume, maximum slip the geological formation can produce) for the fracturing operation. The linear inversion engine 216 can also apply a fracture growth model or use another sensing system data (e.g., microseismic events and geometry mapping, flow allocation in the treatment well) to determine which of the selected locations are most likely to be active. The selected locations where activity is unlikely may be excluded from the linear inversion. Additionally, a regularization routine (e.g., L1 norm routine) may determine a minimal set of the selected locations that can adequately match the real strain data 212, so the other selected locations can be excluded. The linear inversion engine 216 may also apply weights to the estimated strain data 210 or to the predefined constraints to help eliminate solutions that are unreasonable.

To perform the linear inversion and determine the probable distribution of fluid volume and hydraulic fracture orientation in the geological formation, the linear inversion engine 216 can match the estimated strain data 210 to the real strain data 212. For example, the linear inversion engine 216 can match a real strain value of A to the value of A in the estimated strain data. The value of A in the estimated strain data 210 corresponds to certain linear properties. Using these properties from each of the three orthogonal fractures, the linear inversion engine 216 can determine an orientation, volume, and slip for a fracture based on matching the estimated strain data 210 to the real strain data 212. Matching each real strain value to values of the estimated strain data 210 can provide the probable distribution of fluid volume and hydraulic fracture orientation in the geological formation.

In some examples, the processor 202 can determine adjustments 214 based on the linear inversion. The adjustments 214 can include adjustments to the fluid flow rate or proppant concentration for the fracturing operation. Additionally, the adjustments 214 may include adjustments for the fracturing operation to prevent a fracture from entering a nearby wellbore.

In some examples, the processor 202 can perform a non-linear inversion prior to determining the adjustments 214. The non-linear inversion can provide further analysis of the fluid distribution in the geological formation, e.g. providing a more precise estimate of fracture length than can be obtained from the linear inversion. The linear inversion can reduce the solution space for the non-linear inversion, so the non-linear inversion can be performed in a shorter amount of time than if the linear inversion is not performed.

The computing device 200 can also include an action module 218. The action module 218 can include executable program code for taking one or more actions based on the output of the linear inversion engine 216. For example, computing device 200 may execute the action module 218 to make a decision about fluid flow rate and proppant concentration for the fracturing operation based on fracture properties identified in the output. Additionally, the action module 218 may use a fracture count, individual fracture lengths, fracture growth rates as input to models for controlling surface equipment. The action module 218 may also include predetermined control actions based on a determined trigger point for a target. For example, triggering points can be made at 50% of target, 75% of target, or 90% of target. The pre-determined control actions may be based on data analytics models where the data analytics models are built on historical data that may be region or formation specific. The computing device 200 can then generate a graphical user interface (GUI) indicating fluid distribution and hydraulic fracture orientation and display the GUI on the display device 222, such as a liquid crystal display or light emitting diode display.

Figure 3:
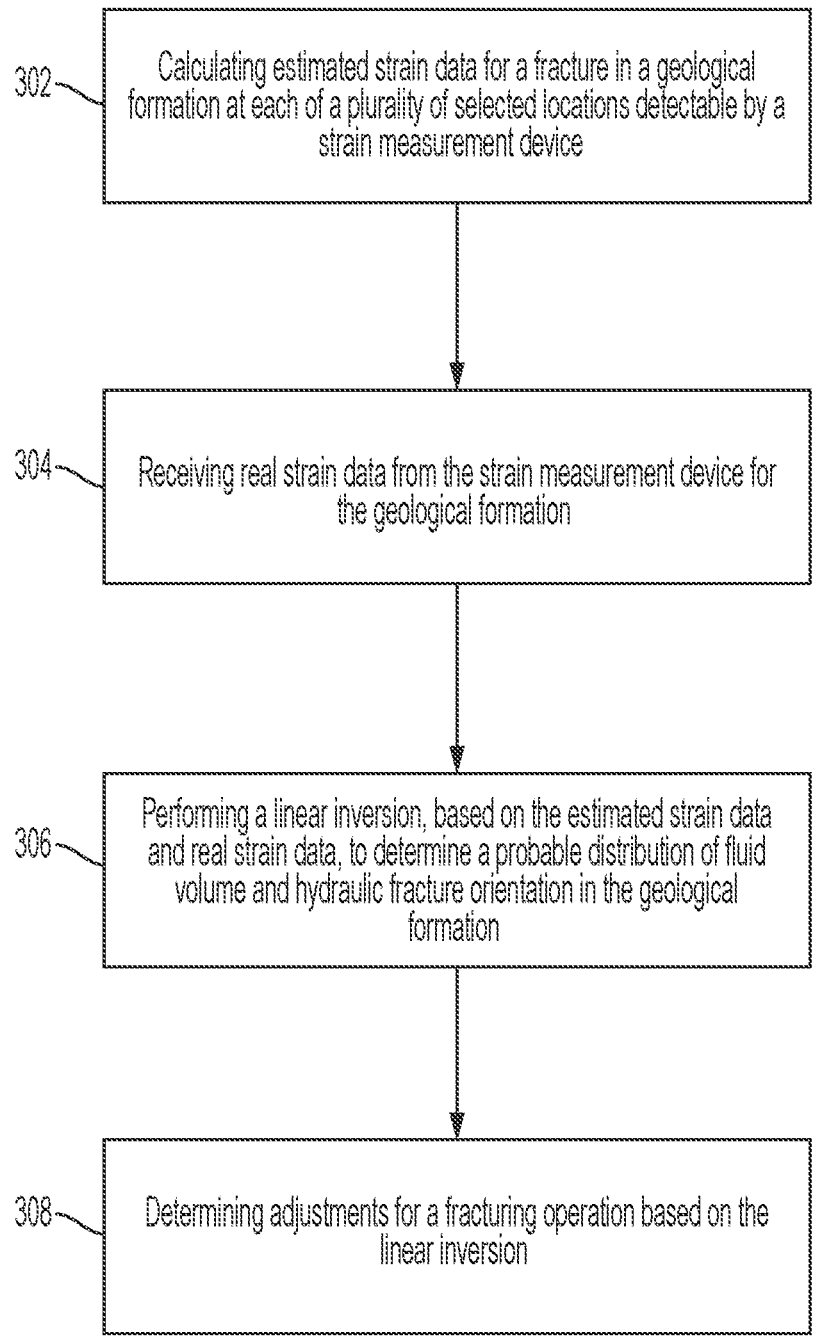
FIG. 3 is a flow chart of a process for determining fluid distribution and fracture orientation in a geological formation according to one example of the present disclosure.

In some examples, the computing device 200 can implement the process shown in FIG. 3 for effectuating some aspects of the present disclosure. Other examples can involve more operations, fewer operations, different operations, or a different order of the operations shown in FIG. 3. The operations of FIG. 3 are described below with reference to the components shown in FIG. 2.

FIG. 3 is a flow chart of a process for determining fluid distribution and fracture orientation in a geological formation according to one example of the present disclosure. At block 302, the processor 202 calculates estimated strain data 210 for a fracture in a geological formation at each of a plurality of selected locations detectable by a strain measurement device 220. The estimated strain data 210 may be calculated from varying linear properties for orthogonal fractures at the selected locations.

At block 304, the processor 202 receives real strain data 212 from the strain measurement device 220 for the geological formation. The strain measurement device 220 may receive the real strain data 212 from a fiber optic cable deployed in a wellbore of the geological formation.

At block 306, the processor 202 performs a linear inversion, based on the estimated strain data 210 and real strain data 212, to determine a probable distribution of fluid volume and hydraulic fracture orientation in the geological formation from the linear inversion. Performing the linear inversion can involve the processor 202 matching the real strain data 212 to values of the estimated strain data 210. Matching the real strain data 212 to the estimated strain data 210 can indicate the probable orientation and distribution of fractures in the geological formation. The processor 202 may perform stabilization operations prior to the linear inversion to reduce the time and computing requirements of the linear inversion.

At block 308, the processor 202 determines adjustments 214 for a fracturing operation based on the linear inversion. The adjustments 214 can be based on the probable distribution of fluid volume and hydraulic fracture orientation. In some examples, a non-linear inversion can be performed by the processor 202 prior to determining the adjustments 214.

Figure 4:
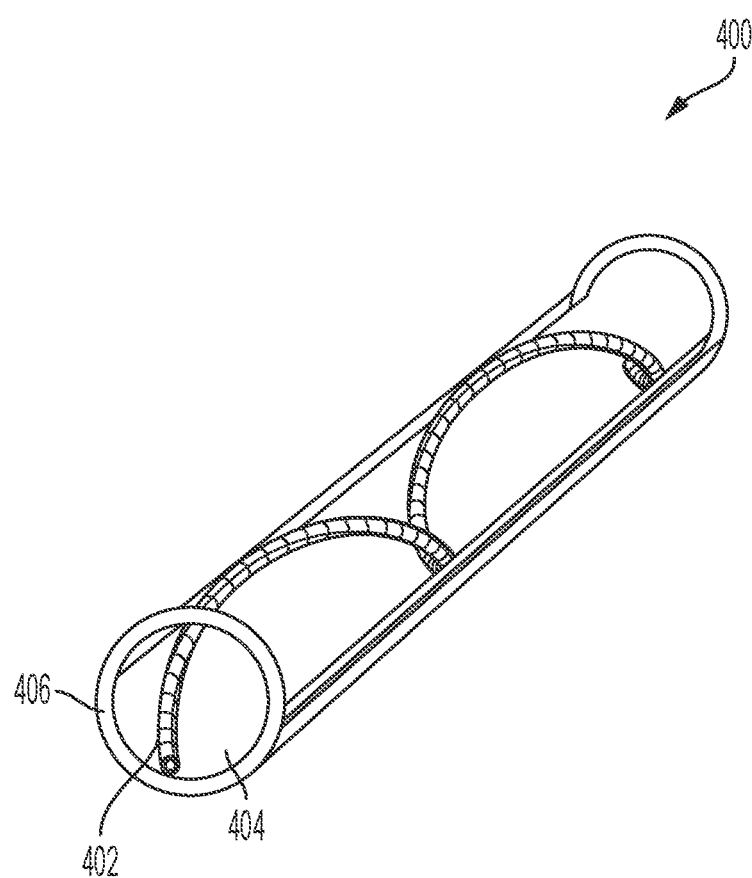
FIG. 4 is a cross-section of a fiber optic cable according to one example of the present disclosure.

FIG. 4 is a schematic of a fiber optic cable 400 according to one example of the present disclosure. The fiber optic cable 400 can be deployed in a wellbore of a geological formation to measure strain in the geological formation. The fiber optic cable 400 may transmit the strain measurements to a strain measurement device.

In some examples, the fiber optic cable 400 includes optical fibers 402 and a material 404 extending around the optical fibers 402. There may be one or more optical fibers 402 in the fiber optic cable 400. The fiber optic cable 400 may be a FIMT with a metal tube 406 extending around the material 404. The material 404 extending around the optical fibers 402 may be a gel or other material capable of accurately coupling strain for measurement by the strain measurement device. The material 404 can be a gel with a large degree of crosslinking between its constituent molecules. The crosslinking can allow the material 404 to convey a high level of shear stress. Additionally, the material 404 can be a gel that flows and self-heals in the presence of large shear stress. As a result, a rupture can occur in the material 404 rather than in the optical fibers 402. Over time, the crosslinking can occur in the material 404 between the ruptured areas and provide renewed stress-carrying capacity.

In some examples, the material 404 may be cured before the fiber optic cable 400 is deployed in the wellbore. Alternatively, the material 404 may be a thermosetting material and cured after the fiber optic cable 400 is deployed in the wellbore. The thermosetting material can allow the fiber optic cable 400 to be used as a strain sensor without drift for long-term static strain monitoring.

In some aspects, a system, method, and non-transitory computer-readable medium for determining a distribution of fluid volume and hydraulic fracture orientation are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: calculating, by a computing device, estimated strain data for a fracture in a geological formation at each of a plurality of selected locations detectable by a strain measurement device; receiving, by the computing device, real strain data from the strain measurement device for the geological formation; performing, by the computing device, an inversion to determine a probable distribution of fluid volume and hydraulic fracture orientation in the geological formation based on the estimated strain data and real strain data; and determining, by the computing device, adjustments for a fracturing operation based on the inversion.

Example 2 is the method of example 1, further comprising performing a regularization routine prior to the inversion to stabilize the inversion.

Example 3 is the method of examples 1-2, wherein the inversion is bounded by predefined constraints of the fracturing operation.

Example 4 is the method of examples 1-3, further comprising receiving the real strain data from a fiber optic cable deployed in a wellbore of the geological formation.

Example 5 is the method of examples 1-4, wherein the fiber optic cable comprises: one or more optical fibers; and a material extending around the one or more optical fibers, wherein the material has a high effective modulus at high frequencies and a low effective modulus at low frequencies.

Example 6 is the method of examples 1-5, further comprising performing a non-linear inversion based on the inversion prior to determining adjustments for the fracturing operation.

Example 7 is the method of examples 1-4, wherein the fiber optic cable comprises: one or more optical fibers; and a material extending around the one or more optical fibers, wherein the material comprises a thermosetting polymer.

Example 8 is the method of examples 1-7, wherein the inversion comprises a linear inversion.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
    calculating, by a computing device, estimated strain data for a fracture in a geological formation at each of a plurality of selected locations detectable by a strain measurement device;
    receiving, by the computing device, real strain data from the strain measurement device for the geological formation;
    performing, by the computing device, an inversion to determine a probable distribution of fluid volume and hydraulic fracture orientation in the geological formation based on the estimated strain data and real strain data; and
    determining, by the computing device, adjustments for a fracturing operation based on the inversion.

2. The method of claim 1, further comprising performing a regularization routine prior to the inversion to stabilize the inversion.

3. The method of claim 2, wherein the inversion is bounded by predefined constraints of the fracturing operation.

4. The method of claim 1, further comprising receiving the real strain data from a fiber optic cable deployed in a wellbore of the geological formation.

5. The method of claim 4, wherein the fiber optic cable comprises:
    one or more optical fibers; and
    a material extending around the one or more optical fibers, wherein the material has a high effective modulus at high frequencies and a low effective modulus at low frequencies.

6. The method of claim 1, further comprising performing a non-linear inversion based on the inversion prior to determining adjustments for the fracturing operation.

7. The method of claim 4, wherein the fiber optic cable comprises:
    one or more optical fibers; and
    a material extending around the one or more optical fibers, wherein the material comprises a thermosetting polymer.

8. The method of claim 1, wherein the inversion comprises a linear inversion.

\* \* \* \* \*